United States Patent [19]

Rees et al.

[11] Patent Number: 5,471,649
[45] Date of Patent: Nov. 28, 1995

[54] BASE STATION TRANSCEIVER DIAGNOSTIC EQUIPMENT

[75] Inventors: Idris J. M. Rees, Reading; Phillip Pickersgill, Wantage, both of United Kingdom

[73] Assignee: Motorola, Inc., Schaumburg, Ill.

[21] Appl. No.: 249,677

[22] Filed: May 26, 1994

Related U.S. Application Data

[63] Continuation of Ser. No. 787,438, Nov. 4, 1991, abandoned.

[30] Foreign Application Priority Data

Mar. 31, 1990 [GB] United Kingdom ............. 9007330

[51] Int. Cl.⁶ ......................................... H04B 17/00
[52] U.S. Cl. ..................... 455/67.4; 455/88; 455/115; 455/226.1; 455/54.1
[58] Field of Search ................. 455/67.1, 67.4, 455/69, 70, 88, 115, 126, 127, 129, 54.1, 54.2, 67.3, 51.1, 226.1; 379/59, 60, 63; 370/108, 95.1; 375/107, 109; 324/646, 637

[56] References Cited

U.S. PATENT DOCUMENTS

| | | | |
|---|---|---|---|
| 4,443,661 | 4/1984 | Kubo | 455/67.3 |
| 4,580,092 | 4/1986 | Squire | 324/646 |
| 4,810,960 | 3/1989 | Owen et al. | 455/67.1 |
| 4,977,607 | 12/1990 | Maucksch et al. | 455/67.1 |
| 5,077,759 | 12/1991 | Nakahara | 455/51.1 |
| 5,109,535 | 4/1992 | Kume et al. | 455/67.4 |
| 5,117,503 | 5/1992 | Olson | 455/51.1 |
| 5,127,100 | 6/1992 | D'Amico et al. | 455/56.1 |
| 5,134,643 | 7/1992 | Iwata | 379/63 |
| 5,201,061 | 4/1993 | Goldberg et al. | 455/67.1 |

FOREIGN PATENT DOCUMENTS

| | | |
|---|---|---|
| 56-52946 | 12/1981 | Japan . |
| 2098427 | 11/1982 | United Kingdom . |

OTHER PUBLICATIONS

S. Hansen et al.: "The GSM Base Station System and the Related Equipment".

Philips Telecommunication & Data Systems Review, vol. 45, No. 3, Sep. 1987, Eindhoven NL. pp. 69–80, E. Grohmann et al.: "Radio Base Station RBS 901 for the Nordic Mobile Telephone System".

8th European Conference on Electrotechnics Eurocon 88, Jun. 88, Stockholm (SE), pp. 470–473; S. Hansen et al.: "The GSM Base Station System and the Related Equipment".

Primary Examiner—Reinhard J. Eisenzopf
Assistant Examiner—Nguyen Vo
Attorney, Agent, or Firm—Raymond J. Warren

[57] ABSTRACT

Base Station Transceiver Equipment 10 is provided such as for use in a cellular radio telephone system. In a first aspect of the invention, a device within the equipment measures a parameter (e.g. timing, signal strength) of a mobile transceiver and instructs the mobile to adjust that parameter of its transmitted signals. Subsidiary transceiver equipment 11 (a diagnostic sub-system or "test mobile") is provided in relative proximity to the base station transceiver equipment. The subsidiary equipment can change the parameter of its transmissions to simulate relative distance from the base station transceiver equipment for test purposes. In other aspects of the invention, a device is provided for testing the base station antenna.

12 Claims, 2 Drawing Sheets

—PRIOR ART—

BASE STATION TRANSCEIVER DIAGNOSTIC EQUIPMENT

This is a continuation of application Ser. No. 07/787,438, filed Nov. 4, 1991 and now abandoned.

This invention relates to base station transceiver equipment for communication with a mobile transceiver in a radio communication system, such as a cellular radio system. The invention particularly relates to diagnostic equipment for testing certain aspects of the operation of such equipment.

SUMMARY OF THE PRIOR ART

In the GSM Pan-European Digital Cellular Telephone System, base stations transmit commands to mobile units to instruct the mobile units precisely when to transmit their messages to the base stations. A base station measures the time of receipt of messages from mobiles communicating with it. If messages are being received from a mobile at times which are early or late with respect to that mobile's assigned time slots, the base station transmits a command to that mobile to instruct that mobile to retard or advance its transmissions respectively.

Since it is a feature of the system that communications can be maintained with the mobile units while those units are in motion, it is necessary to continually measure the time of receipt of messages from a mobile and continually instruct the mobile to retard or advance its transmissions. Thus, if a mobile moves from a position distant from a base station to a position closer to that base station while communicating therewith, the propagation delay of its transmissions will be reduced, and its messages will be received at the base station in advance of its assigned time slots. In such circumstances the base station commands the mobile to retard its transmissions to compensate for the reduced propagation delay. Conversely, if a mobile moves significantly away from its base station, it must advance its transmissions.

The above timing adjustment routine is described in flowchart form in FIG. 1. When a mobile is switched on, ready for transmission (step 1), it receives the synchronisation signal transmissions from the nearest base station and synchronises to this (step 2). Once synchronised, the mobile transmits to the base station as shown is step 3. The mobile commences transmission with a predetermined timing advance relative to the timing established from sychronization. In step 4, the base station measures the actual timing advance. The actual timing advance measured will depend upon the propagation delay. In step 5, the base station asks the mobile what is its current timing advance. At the start of the transmission, the current timing advance will be the predetermined timing advance. As shown in step 6, the base station calculates the change required to bring the mobile's transmissions accurately in line with its allocated time slot and it adds or subtracts this error to the current value from the mobile. It transmits this new value to the mobile. The mobile advances its timing by the amount of the new value received (step 7), and continues transmission (step 3). The adjustment of the timing advance continues in this closed loop until the call is terminated. The change in the timing advance of the mobile is a large step in the first instance, and thereafter generally takes place in smaller steps. The timing advance instructions are transmitted on a different channel to that of the signals for which the reception time is measured.

As for timing of transmissions from the mobile, the signal strength of those transmissions, as measured at the base station, will vary according to distance. In the GSM system, the base station instructs the mobile as to the output power at which the mobile should transmit.

The adjustment of the mobile output power is carried out by means of a routine very similar to that shown in FIG. 1.

The GSM specification sets down recommendations for testing of equipment on the system. Recommendation GSM 12.11 dated 15 Apr. 1989 provides recommendations for maintenance of the base station system (BSS). While that document does not make specific recommendations for testing of the above timing and power control routines, it is accepted that testing of these routines will have to be carried out by system operators.

In current cellular radio systems, such as the UK analog TACS system, systems operators have field test equipment mounted in vehicles for testing various aspects of the system in the field. It has hitherto been assumed that the testing of the above routines will need to be done from a field test vehicle which establishes a call with a base station and moves closer to or further from the base station in order to change the propagation of its messages. The field test equipment can then check that the base station transmits the correct command to adjust the transmission timings according to the change in the propagation delays and the power level according to the fading.

It is inconvenient to carry out tests in mobile field test equipment. The use of mobile field test equipment is expensive in terms of the staff required and other costs and the carrying out of the tests is slow and cumbersome and not particularly accurate or reliable. In addition, if mobile field test equipment detects an unduly low power level from a transmitter, it is unable to identify whether this is as a result of a fault in the transmitter R.F. stage or in its antenna.

It would be desirable to carry out the testing from stationary equipment.

It would also be desirable to provide means for testing the base station antenna.

SUMMARY OF THE INVENTION

According to a first aspect of the present invention, there is provided equipment comprising means for measuring a parameter distance (e.g. time of receipt, or power) of signals from the mobile transceiver and means for transmitting a command to the mobile transceiver to instruct the mobile transceiver to adjust that parameter of its transmitted signals, characterised in that the base station transceiver equipment has stationary subsidiary transceiver equipment associated therewith for simulating transmissions of a mobile transceiver, the subsidiary transceiver equipment having means for changing the parameter of its transmissions thereof to simulate relative distance from the base station and means are provided for testing that the base station equipment issues the correct command to instruct the subsidiary transceiver equipment to change the parameter to compensate for the simulated distance.

By artificially advancing or retarding the transmissions of the subsidiary transceiver equipment, that equipment can simulate the behaviour of mobile field test equipment.

The invention has the significant advantage that the subsidiary transceiver equipment can be mounted at the same location as the base station equipment, and can report faults to the system operator along the same fault reporting channels as other aspects of the base station testing routines.

It is preferred that the base station transceiver equipment comprises interface means for reporting faults to a remote location (e.g. an operator management centre) with permanent or wireline connection being provided between the base station transceiver equipment and the subsidiary transceiver equipment, for enabling the subsidiary transceiver equipment to report to the remote location via the interface on the receipt of incorrect timing adjustment commands received from the base station transceiver equipment.

The permanent connection may be an electrical connection or optical connection. The base station transceiver equipment and the subsidiary transceiver equipment may be located not only at the same location, but even in the same cabinet.

RF signals may be exchanged between the base station transceiver equipment and the associated subsidiary transceiver equipment by a cable link. This eliminates the possibility of faults in the antenna of the two items of equipment. In contrast, the prior art method of testing is vulnerable to all the possible faults that might arise through the RF connection, including spurious propagation delays due to echoes.

According to a second aspect of the invention, there is provided base station transceiver equipment comprising principal and subsidiary transceiver equipment and an antenna, wherein the subsidiary transceiver equipment is connected to the principal transceiver equipment and tile antenna by a directional coupler, the subsidiary transceiver equipment further having means for measuring R.F. power reflected from the antenna for testing of the antenna.

It is preferred that the directional coupler has means for switching between a first state in which the subsidiary transceiver equipment communicates with the principal transceiver equipment for testing thereof and a second state in which the subsidiary transceiver equipment is connected to the antenna.

According to a third aspect of the invention, there is provided a cellular radio communications system comprising a base station transmitter, a receiver located-remote from said transmitter, a central management centre, and a communications link connecting the receiver to the central management centre, said receiver comprising means for monitoring a parameter of transmissions from the transmitter and means for reporting a fault to the central management centre if a change in said parameter is detected.

The parameter measured may be signal strength and a fault is reported if the signal strength drops substantially. Alternatively, the parameter is the timing of transmissions. In the latter case, at least a second base station transmitter may be provided, located remote from the first transmitter and the parameter is the relative timing of transmissions of the first and second transmitters.

An exemplary embodiment of the present invention will now be described with reference to the accompanying drawings.

DETAILED DESCRIPTION OF A PREFERRED EMBODIMENT

Figure 2:
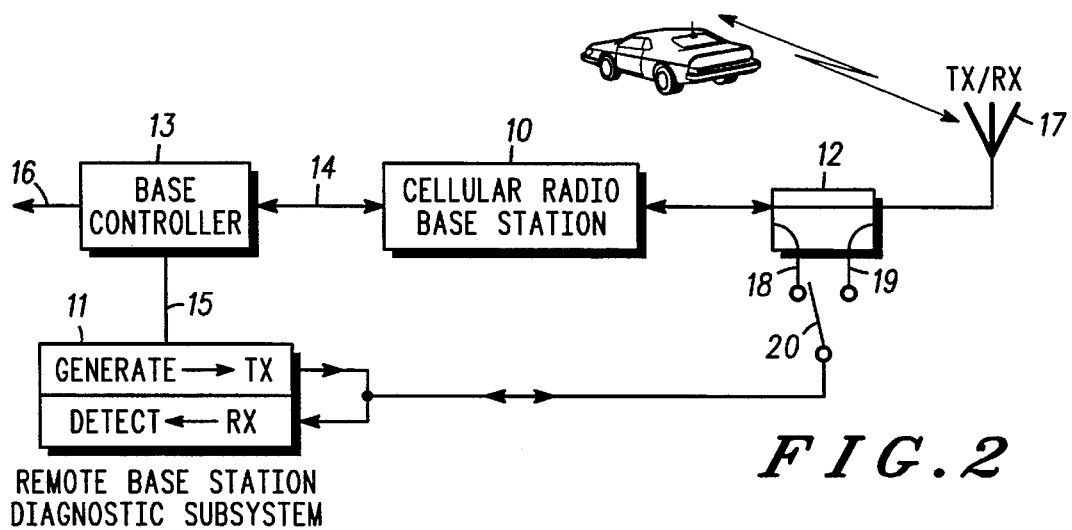
FIG. 2 shows a block diagram of equipment in accordance with the invention.

Referring to FIG. 2, the equipment shown comprises a cellular radio base station 10, a remote base station diagnostic subsystem (RBDS) 11, a coupler 12 providing RF coupling between the base station 10 and the RBDS 11. A base controller (BSC) 13 is provided, for overall control of the base station 10 and of its test routines in accordance with known techniques such as those provided by the GSM Pan-European Digital Cellular System. The BSC 13 is connected to the base station transceiver 10 by a fiber optic link 14, while the BSC 13 is connected to the RBDS 11 by a local area network fibre 15. The BSC 13 connects to an operator management centre (OMC 40, FIG. 3) via a megastream link 16. A transmit receiver antenna 17 is connected to the base station 10 via the coupler 12. The coupler 12 has forward and reverse directional paths 18 and 19 for coupling the RBDS to the the base station 10 and the antenna 17 respectively. Coupling to each of these paths is by means of a two-way switch 20.

Figure 1:
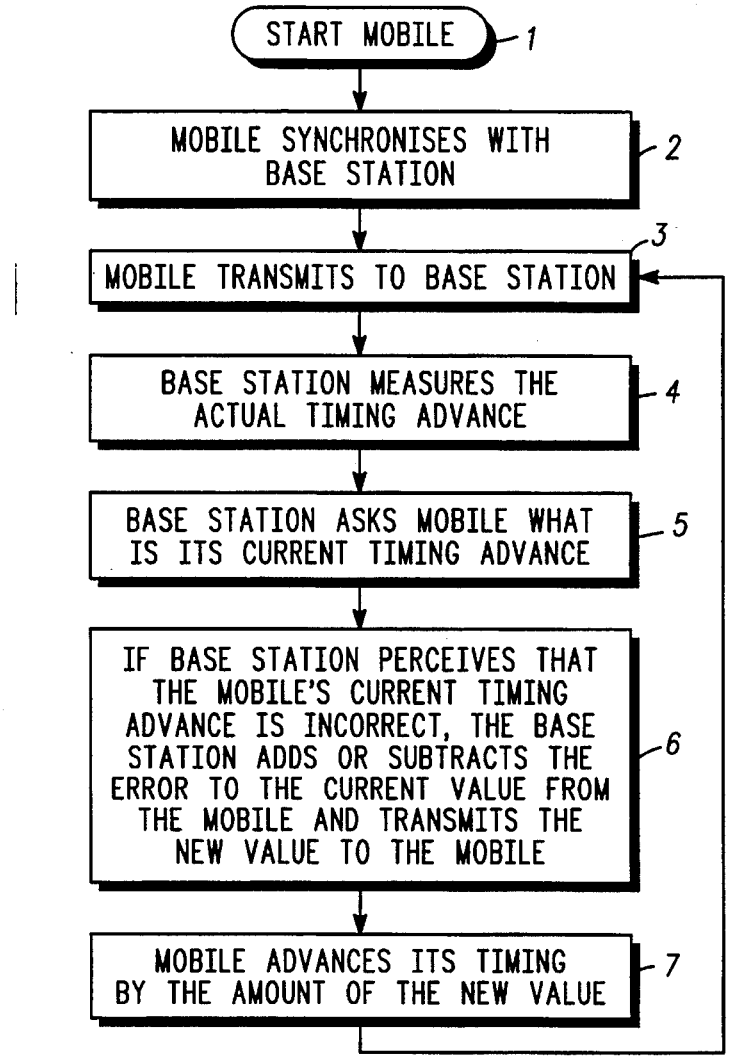
FIG. 1 shows a flow-chart describing the timing adjustment routine of a cellular telephone system in accordance with the prior art.

The remote base station diagnostic sub-system 11, which lies at the heart of the invention, is, in fact, a modified item of subscriber equipment, modified by being permanently mounted in the base station cabinet and connected to the base station 10 and the base station controller 13. The base station, its controller 13 and the RBDS 11 are programmed to execute the timing adjustment routine of FIG. 1 and a corresponding transmit power adjustment routine. In this respect, the base station and its controller treat the RBDS 11 like any other mobile operating under a time division multiplex (TDM).

The operation of the equipment is as follows. To test the timing routine of the base station, the base station controller 13 initiates a test routine, which causes a coaxial cable switch 20 to connect the RBDS 11 to the base station transceiver 10 via the coupler 12. The controller 13 then causes the RBDS 11 to generate transmissions to request a handshake with the base station transceiver 10. The RBDS transceiver 11 synchronises with the base station transceiver 10 and the equipment is ready to carry out a timing test routine. The controller 13 instructs the RBDS 11 to offset its transmission by up to 23 milliseconds with respect to an assigned time slot that, to the base station transceiver 10, upon measurement of a parameter of the transmission associated with distance (time of receipt of the transmitted signal) it appears that the RBDS transceiver is at a range of up to 35 kilometres (it takes the radio signal 11.5 ms to travel 35 km). Thus, the controller 13 artificially interferes with the routine shown in FIG. 1 by artificially adjusting the predetermined timing advance of the RBDS. This is carded out in step 3 of FIG. 1. When the base station transceiver 10 detects that messages frown the RBDS 11 are arriving late, it issues a command telling the RBDS to advance. This command is received by the RBDS via the permanent coaxial link and the command is decoded at the RBDS and transmitted to the base station controller 13 via the local area network 15. The controller 13 compares the command received with the original instruction. If the command received instructs the RBDS to advance its timing until the delay is compensated for, then the base station transceiver 10 has passed the test and the timing control feature of the base station is operating correctly. If the timing retard value received by the base station transceiver 10 does not correspond to delay by which the RBDS initially transmitted the RBDS 11 logs this as a fault in the base station transceiver timing control, and this error is transmitted to the OMC via the megastream link 16.

The command issued by the base station transceiver 10 to the RBDS 11 may be a simple instruction to advance or retard by an incremental amount. Alternatively, it may quantify the size of the advance or the delay. In either case, the principal of the invention is the same.

The controller 13 can cause the RBDS 11 to advance and retard by a number of different amounts, thereby varying the conditions to which the base station transceiver 10 must respond.

As for testing of the timing routine, it is an aspect of this invention that other parameters associated with distance, such as power, can be measured and a power control routine tested. The base station controller 13 interferes with the power control routine by causing the RBDS 11 to transmit at reduced power, thereby simulating distance from the base station. This is done by switching an attenuator into the output from the RBDS 11. The attenuator used has a 20 dB fixed component and a 0 to 80 dB variable component. The output power of the RBDS 11 is controlled by means of the 80 dB variable attenuator. The base station measures the actual signal strength of the signal received from the RBDS and also asks the RBDS what its current output power is. If the base station determines that the received signals strength falls below a predetermined threshold and that the RBDS is transmitting below full power (less the power drop caused by the base station controller 13), it will instruct the RBDS to increase its power. The base station controller 13 determines whether the base station 10 has instructed the RBDS 1 to increase its power by the correct amount. A fault is reported if this is not the case.

The error can be logged at either the RBDS 11 or the BSC 13. Of course, the failure of the routine shown in FIG. 1 could arise as a result of a fault in the base station's actions for the mobile's actions. The actual cause of the fault must be identified by analysis of the resulting data or by other tests.

To test the antenna 17, the RBDS measures forward and reverse power levels from the base station transceiver 10. The forward power level is measured with the switch 20 in the left hand position as shown and the reverse power level is measured with that switch in the right hand position. If the antenna is faulty, there will be substantial reflected (reverse) power from the antenna 17, when compared with the forward power.

The two-port directional coupler 12 is situated in the feed to the antenna 17. The coupler is positioned between the antenna and multicoupler equipment of the base station 10. It is therefore unprotected from lightning transients etc. The coupler serves four purposes:

1) to feed the RBDS transmit signals into the base station receiver;

2) to feed base station transmit signals into the RBDS receiver;

3) to measure base station forward and reverse power levels to allow transmit antenna VSWR calculations; and 4) to "transmit" a test signal such that receive antenna VSWR can be measured (necessary only for separate receive and transmit antennas).

It must be remembered that when the test signal is injected in this way, external signals are still present from adjacent cells. The test algorithm makes allowance for this, and preferably only fails the base station at times of low activity (i.e. at night time).

Figure 3:
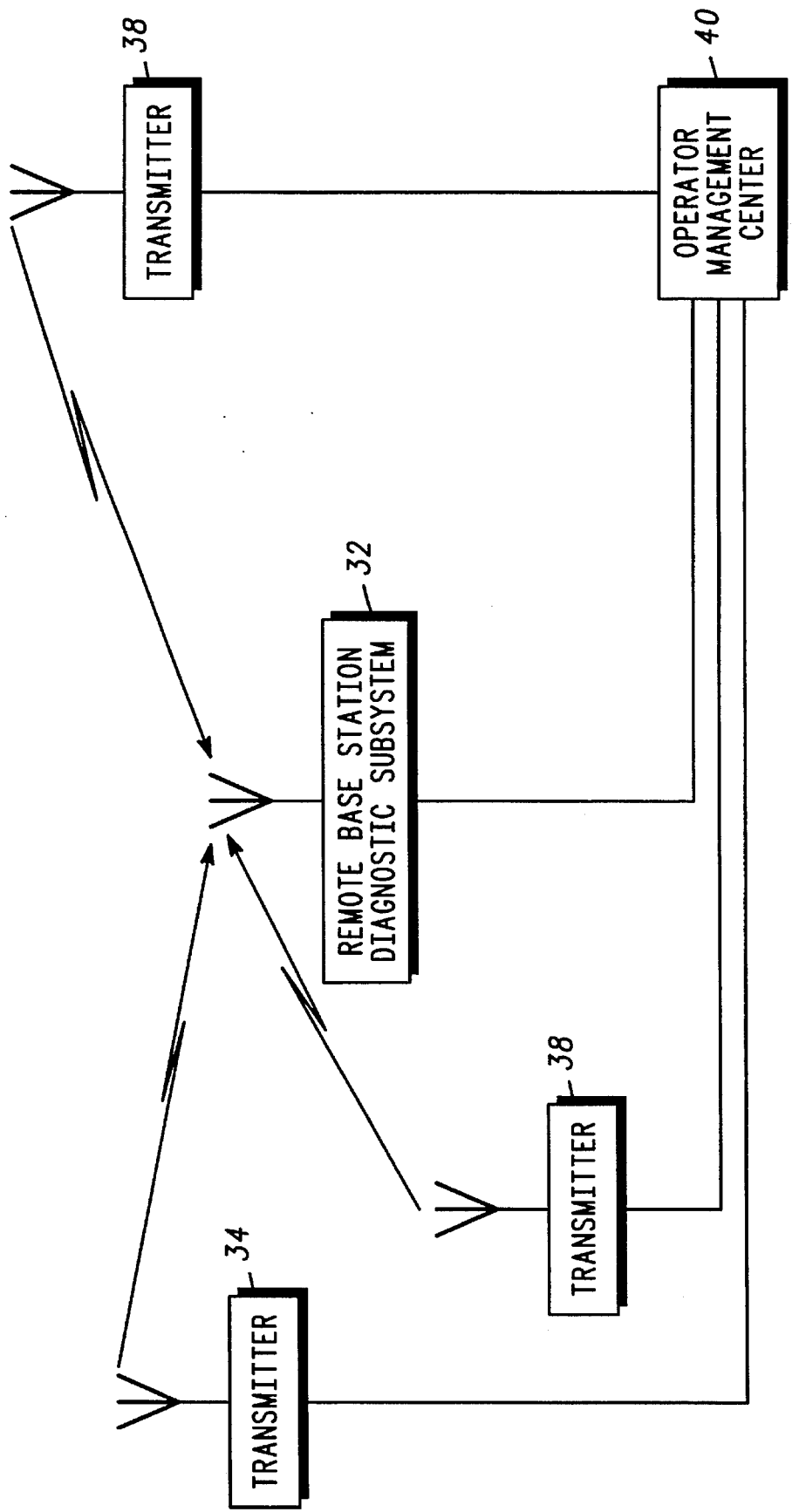
FIG. 3 shows a cellular radio system in accordance with the third aspect of the present invention.

It is a feature of cellular radio systems that a cell site transceiver cannot listen to an adjacent cell site transceiver, because they operate on different channels. Only a mobile unit can listen to a base station. In the third aspect of the present invention, the RBDS 11 monitors the transmissions of adjacent cell sites. If the signal strength of an adjacent cell site drops, this is an indication of a fault at the adjacent cell site (e.g. a faulty antenna). In the case where the cell sites are synchronised together, the RBDS detects if there is a change in the timing of synchronisation of one cell site. In either case, the RBDS reports a fault directly to the OMC via the BSC 13 and the data link 16. For this purpose, the RBDS uses an antenna separate from the base station transceiver antenna 17. This is illustrated in FIG. 3, where an RBDS 32 is shown and three base stations 34, 36 and 38, separate therefrom. In practice, the RBDS will generally be associated with one of the base stations. The RBDS is connected to an OMC 40, as are the three base stations. The RBDS reports to the OMC a change in signal strength or relative timings of the three base stations. Since the three base stations are under overall control from the OMC (or at least report their operations to the OMC), the OMC can determine that the detected change is a fault (rather than a specific operational change).

It will, of course, be understood that the above invention has been given by way of example only, and that modifications of details can be made within the scope of the invention.

We claim:

1. Base station transceiver equipment for communication with a mobile transceiver in a radio communications system, said equipment comprising:

principal transceiver equipment for receiving signals from and transmitting signals to the mobile transceiver;

means for measuring, by the principal transceiver equipment, a parameter, of a signal from the mobile transceiver;

means, at the principal transceiver equipment, for instructing, the mobile transceiver to adjust said parameter of its transmitted signals by issuing a command to the mobile transceiver;

stationary subsidiary transceiver equipment in relative proximity and coupled to the principal transceiver equipment for simulating transmissions of the mobile transceiver to the means for measuring, and for receiving the command from the principal transceiver equipment, the subsidiary transceiver equipment having means for changing said parameter of its transmissions to simulate relative distance from the principal transceiver equipment to the mobile transceiver, said parameter being selected to generate a specific command from said means for instructing; and means for testing, at the stationary subsidiary transceiver, that the means for instructing issued the specific command to instruct the subsidiary transceiver equipment to adjust said parameter of its transmissions to compensate for said simulated distance.

2. Equipment according to claim 1, wherein said means for testing comprises means for comparing a change in said parameter, resulting from receipt of the command, with a change having been made to the parameter to simulate the relative distance and means for indicating the existence of a fault if the former does not compensate for the latter.

3. Equipment according to claim 1, wherein the parameter measured and adjusted is at least one timing parameter.

4. Equipment according to claim 1, wherein the parameter measured and adjusted is the power output by the stationary subsidiary transceiver equipment to simulate the mobile transceiver located at a distance from the principal transceiver equipment and received at the means for measuring.

5. Equipment according to claim 1, arranged to receive timing adjustment commands, including correct and potentially incorrect timing adjustment commands, further comprising interface means for reporting faults to a remote location, characterised in that a wireline connection is provided between the interface means and the subsidiary transceiver equipment for enabling the subsidiary transceiver equipment to report to the remote location via the interface means the receipt of incorrect timing adjustment commands received from the base station transceiver equipment.

6. Equipment according to claim 1, wherein the principal transceiver equipment and its associated subsidiary transceiver equipment are connected by a cable link for exchange of r.f. signals.

7. Base station transceiver equipment comprising:

principal transceiver equipment;

subsidiary transceiver equipment;

an antenna; and a directional coupler;

wherein the subsidiary transceiver equipment is controllably coupled to the principal transceiver equipment and the antenna by the directional coupler, the directional coupler having means for switching between a first state in which the subsidiary transceiver equipment, having a means for measuring an R.F. power level of a forward power of a signal transmitted by the principal transceiver equipment, is coupled to the principal transceiver equipment and a second state in which the subsidiary transceiver equipment is coupled to the antenna, the subsidiary transceiver equipment using the means for measuring R.F. power of a reverse power level of the signal transmitted by the principal transceiver equipment and reflected from the antenna for testing of the antenna.

8. Equipment according to claim 7, wherein the reverse power level of the signal reflected from the antenna and received by the subsidiary transceiver equipment, originates from the principal transceiver equipment.

9. Base station transceiver equipment for a time division multiplexed (TDM) communication system having a time-slot assigned for communication with a mobile transceiver in the TDM system, said equipment comprising:

principal transceiver equipment for receiving signals from and transmitting signals to the mobile transceiver;

means for measuring, by the principal transceiver equipment, a timing of a signal, relative to the assigned time-slot, from the mobile transceiver;

means, at the principal transceiver equipment, for instructing the mobile transceiver to adjust said timing of its transmitted signals by issuing a command to the mobile transceiver;

stationary subsidiary transceiver equipment for simulating transmissions of the mobile transceiver to the means for measuring and for receiving the command from the means for instructing, the subsidiary transceiver equipment being located a first distance from said principal transceiver equipment and having means for changing a timing of its transmissions to simulate a location at a second distance from said principal transceiver equipment, said second distance being greater than said first distance, to the mobile transceiver, said timing of transmissions being selected to generate a specific command from said means for instructing, and means for testing, at the subsidiary transceiver, that the means for instructing issued the specific command to instruct the subsidiary transceiver equipment to adjust said timing of its transmissions to compensate for said simulated distance.

10. A cellular radio communications system comprising:

a central management centre responsible for an operational control of the cellular radio communications system;

a plurality of adjacent cells each having a base station transmitter responsive to the central management centre;

at least one receiver associated with a first base station transmitter; and a communications link connecting the receiver to the central management centre;

wherein said receiver comprises means for monitoring a parameter of transmissions from a second base station transmitter remote from the first base station transmitter and means for reporting to the central management centre if a change in said parameter is detected; and the central management centre has means for determining whether the reported change in said parameter is due to a fault in the second base station transmitter and not to a specific operational change anticipated by the central management centre.

11. A system according to claim 10, wherein the parameter is the relative timing of transmissions of the first and second transmitters.

12. Base station transceiver equipment for communication with a mobile transceiver in a radio communications system, said equipment comprising:

principal transceiver equipment for receiving signals from and transmitting signals to the mobile transceiver;

means for measuring, by the principal transceiver equipment, a parameter of a signal from the mobile transceiver;

means, at the principal transceiver equipment, for instructing the mobile transceiver to adjust a timing of its transmitted signals by issuing a command to the mobile transceiver;

stationary subsidiary transceiver equipment for simulating transmissions of the mobile transceiver to the means for measuring and for receiving the command from the means for instructing, the subsidiary transceiver equipment being located a first distance from said principal transceiver equipment and having means for changing said parameter of its transmissions to simulate location at a second distance from said principal transceiver equipment, said second distance being greater than said first distance to the mobile transceiver, said parameter being selected to generate a specific command from said means for instructing, and means for testing, at the subsidiary transceiver, that the means for instructing issued the specific command to instruct the subsidiary transceiver equipment to adjust said parameter of its transmissions to compensate for said simulated distance.

* * * * *